Aug. 21, 1945.   W. T. HANCOCK   2,383,189
POLYMERIZATION OF OILS
Filed March 25, 1942
Fig. 1.
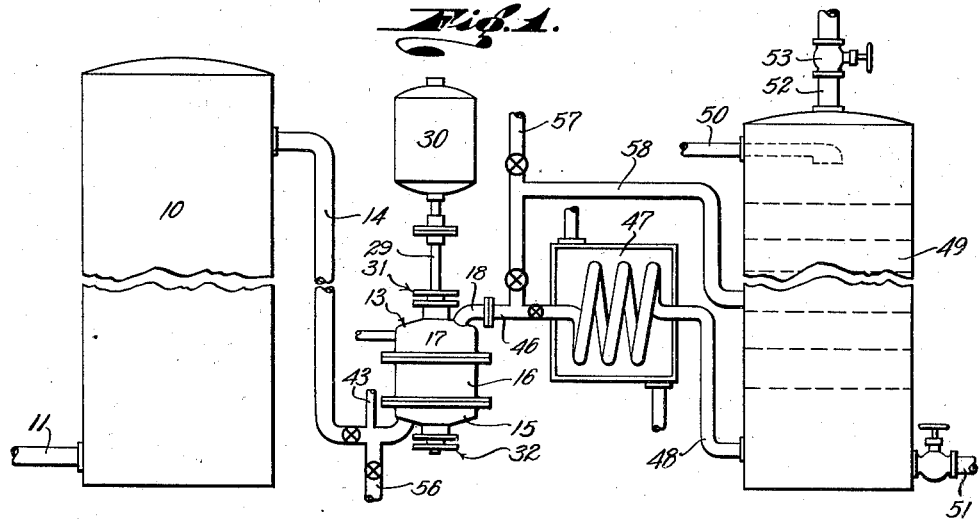
Fig. 2.
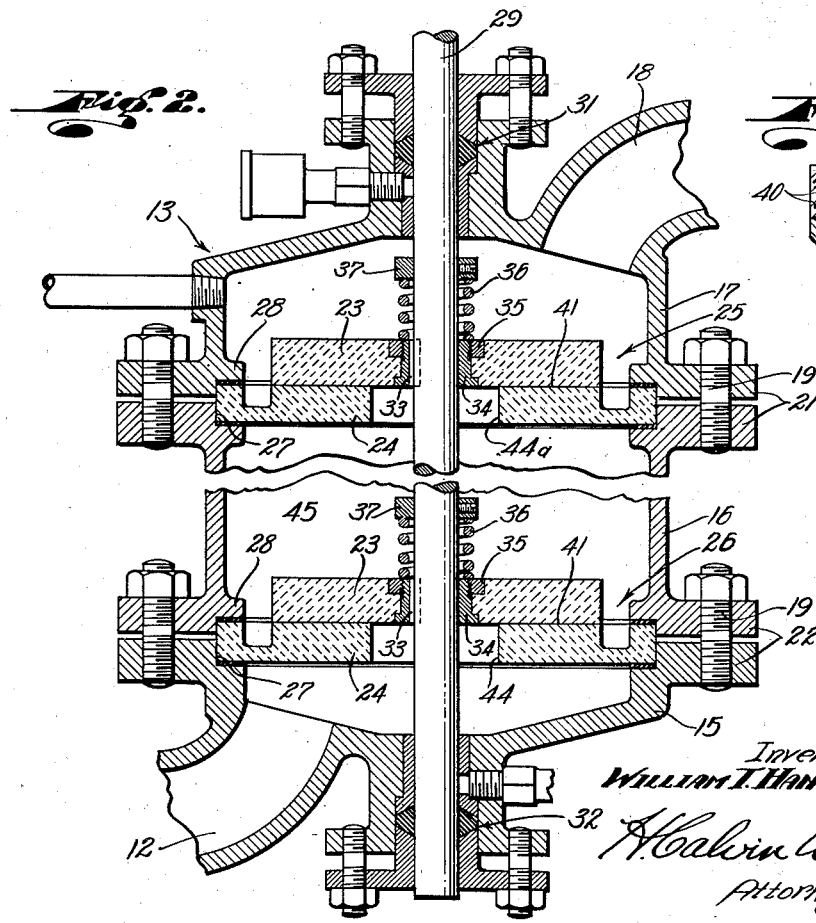
Fig. 3.
Inventor
WILLIAM T. HANCOCK
H. Calvin White
Attorney Patented Aug. 21, 1945

2,383,189

UNITED STATES PATENT OFFICE 2,383,189

POLYMERIZATION OF OILS

William T. Hancock, Long Beach, Calif., assignor to Hancock Oil Company of California, Long Beach, Calif., a corporation of California Application March 25, 1942, Serial No. 436,138

1 Claim. (Cl. 196—78)

This invention relates generally to an improved process for the physical and catalytic treatment of hydrocarbons for the purpose of effecting the combination of relatively low molecular weight constituents, to produce higher molecular weight compounds. Particularly, the invention is applicable to the polymerization of lower molecular weight constituents into larger molecular structures, as manifested ordinarily by an increase in the specific gravity of the oil and percentage of higher boiling constituents. By the use of suitable catalysts, the process may be used to bring about various types of reactions or combinations of lower molecular weight constituents, as for example between combinable or polymerizable unsaturated hydrocarbons, or between unsaturated, e. g. olefinic, and reactive isomers of saturated hydrocarbons. The present application is a continuation-in-part of my application Serial No. 293,387, filed September 5, 1939, on Method of polymerizing oils.

It will be understood that the invention is applicable to the treatment of polymerizable hydrocarbons in liquid or vapor phase. Treatment of polymerizable or unsaturated liquid petroleum oils, for example gasoline pressure distillate, results in a decrease of several points in gravity, an increase of the initial and end boiling points, and also an increase in viscosity. By treatment of gaseous hydrocarbons, such as combinable or polymerizable hydrocarbons in natural gas or cracking plant gases or vapors, I am able to convert normally vaporized hydrocarbons into condensable fractions within a gasoline or other predetermined boiling range.

The invention contemplates treatment of individual oils to effect polymerization, combination or reaction between constituents thereof, and also the treatment of mixtures of different oils selected to cause, under the conditions of treatment by the process, the combination or reaction of determined constituents in the oils. As previously indicated, the reaction may be between the unsaturated constituents of one oil, and unsaturated or reactive saturated isomeric constituents of another oil, the particular character of the combination or reactions effected by the process being subject to variation and control in accordance with the type and composition of the catalyst used.

Speaking typically of polymerization, I have discovered that when the oil is passed between surfaces containing a suitable catalyst or mixture of catalysts, maintained in close relationship and moving relatively at high velocity, polymerization may be made to occur to a substantial degree. While various types and specific forms of apparatus may be employed for subjecting the oil to treatment by passage between catalyst-containing surfaces moving relatively at high velocity, I prefer to use a rotary-type apparatus in which the oil is passed between relatively rotating surfaces being pressed together or maintained in very closely spaced relationship, so as to subject the oil to great frictional and turbulent disturbance in the presence of the catalyst. Various means may be employed for rendering these relatively rotating surfaces catalytically active, as by forming one or both of the entire surfaces of a suitable catalyst, e. g. carborundum or silicon carbide, or by incorporating the catalyst in a carrier material, such as a metallic matrix, in which particles of the catalyst are embedded. Although all the reasons why the oil constituents are converted by treatment according to the process are not fully known, the molecular combinations and reactions apparently are caused by the combined effects of extreme physical disturbances of the oil particles or molecules between the surfaces moving relatively at high speed, and of the catalyst in the presence of the oil particles and molecules undergoing such physically created disturbances.

The invention may first be described specifically as applied to the polymerization of vaporized hydrocarbons. Later in the description it is explained that, by essentially the same method and process, liquid oils also may be treated where it is found desirable to effect polymerization or combinations of the oil constituents, as previously explained.

The invention will be understood more fully from the following detailed description of illustrative systems including a typical form of apparatus for carrying out the process. Reference is had throughout the description to the accompanying drawing, in which:

Fig. 1 is a general view illustrating a system for the treatment of vaporized hydrocarbons;

Fig. 2 is an enlarged sectional view showing a typical form of apparatus for subjecting the oil to polymerization; and Fig. 3 is a fragmentary view showing a variational form of the discs.

In the general view of Fig. 1, numeral 10 indicates a receiver containing polymerizable vapors of any suitable type and composition, for example the vapors in straight-run or cracking plant gases supplied to the receiver through line 11. These vapors ordinarily will comprise fixed gases, as such, and a mixture of normally vaporized hydrocarbons capable of polymerization or reaction to form higher molecular weight compounds. Leaving the receiver 10, the vapors are conducted to the inlet 12 of the polymerizing unit, generally indicated at 13, by way of line 14. As previously indicated, unsaturated or reactive constituents in the vapors introduced to the polymerizing unit are caused to undergo conversion to higher molecular weight hydrocarbons by passage between catalytic surfaces of the polymerizing apparatus moving relatively at high velocity. One of the principal requirements of the polymerizing apparatus is that the surfaces between which the vapors are caused to flow be maintained in closely spaced relationship, preferably substantially in contact, and that the surfaces have sufficient relative velocity to produce a degree of frictional and turbulent disturbance of the vapors required to cause polymerization or reaction between the vapor constituents, in the presence of the catalyst. The typical form of apparatus illustrated is one in which the vapors are passed between relatively rotating surfaces being urged together and arranged to act upon the vapors during their flow between one or more pairs of such surfaces, depending upon the type and properties of the oil being treated, and the extent to which it is desired to produce polymerization or reaction of its constituents.

Referring to Fig. 2, the apparatus comprises a body made up of sections 15, 16, and 17, and is provided with an inlet 12 and an outlet 18. The sections may be suitably interconnected, as by bolts 19 applied to the flanges 21 and 22. The body may contain one or more pairs of relatively rotating discs 23 and 24, two pairs, generally indicated at 25 and 26, being shown as typical. Discs 24 are seated within circular recesses 27, and are engaged and clamped stationarily in position by inwardly projecting flanges 28 on the body sections. A shaft 29 rotatably driven by motor 30, or any other suitable power source, extends into the body through a bearing and packing gland assembly 31, the lower end of the shaft being journaled in a similar bearing and packing assembly indicated at 32. Discs 23 are connected to shaft 29 so as to be rotatably driven thereby and also yieldably pressed toward the companion stationary discs 24, one purpose of this type of connection being to maintain the discs at all times in close relationship, and to retain this same relationship as the discs become worn. The driving connection between the shaft 29 and discs 23 comprises splines 33 carried by the shaft and extending within open end ways within bushings 34 about which the body of the disc may be cast, or to which the disc may be attached in any desired manner, such as by ring nuts 35. Upward movement of discs 23 relatively to the shaft and discs 24 is yieldably resisted by coil springs 36 encircling the shaft and confined between discs 23 and collars 37 attached to the shaft.

It will be understood that either or both discs of each pair may be made of any suitable material or composition presenting a catalytically active surface to the material flowing between the discs. Satisfactory results have been obtained using discs composed of a catalytically active siliceous material that presents a finely irregular surface. Specifically, such discs have been made of carborundum having a finely grained structure and resultant surface irregularity tending to increase the frictional disturbance created in the fluid stream passing between the discs, and therefore the degree of polymerization and interaction between the constituents of the oil or vapors being treated. Instead of making one or both discs in a given pair substantially entirely of a catalytic material, such as silicon carbide, other expedients may be adopted for incorporating the catalyst in the disc to render the surface thereof exposed to the material under treatment, catalytically active. Thus, particles of suitable catalyst, such as metals including aluminum, magnesium, nickel, cobalt, copper, and iron, and the oxides of such metals, may be contained in a disc, the body of which may or may not be formed of a catalytic material, but is intended to serve as a carrier or matrix for the catalyst particles.

Referring to Fig. 3, one or both of the discs may consist of solid catalyst particles 40 embedded in a suitable matrix, consisting for example of metal or metallic alloy selected to afford desirable toughness and resistance to abrasion. Whereas in Fig. 2 the opposed faces 41 of the discs are shown to be formed as substantially plane surfaces, such faces may have annular interfitting irregularities, as shown at 42 in Fig. 3, to extend the surface areas contacted by the fluid material in its passage between the discs.

In operation, the vapors are maintained within receiver 10 under sufficient pressure to overcome the frictional resistance to flow through the entire system. In some instances it may be desirable to inject, as through line 43, into the vapor stream flowing to the polymerizing unit 13, a relatively small amount of liquid oil sufficient to afford some lubrication for the relatively rotating disc surfaces 41, particularly where the polymerized condensate may be inadequate or unsuited for this purpose. Upon entering the polymerizing unit, the gas flowing upwardly through inlet 12 and passage 44 within the lowermost disc 24, exerts sufficient pressure against the companion rotating disc 23 to displace it upwardly a slight distance sufficient for the gas to flow outwardly between the opposing surfaces of the discs in a very thin stream. Discs 23 are rotated at high velocity, preferably in the neighborhood of 1800 R. P. M., or upward to around 3000 R. P. M. with the result that the combined rotative speed of the discs and the downwardly applied pressure on the gas film stream exerted by the weight of the discs and springs 36, subject the gas to an extreme frictional and turbulent surface as it passes outwardly between the discs.

After flowing outwardly from between the lower pair of discs, the oil or vapors flow upwardly through the body chamber 45 and enter the upper stationary disc opening 44a to flow outwardly between the upper pair of discs. As will be understood, the apparatus may contain additional similar pairs of discs through which the material may be subjected to as many stage treatments as may be desired.

The outlet gas may be passed via line 46 through cooler 47, wherein the frictional heat generated in the vapors during their passage between the relatively rotating discs is removed. The vapors then may be passed through line 48 into a perforated plate or bubble tray column 49, wherein the heavier and polymerized fractions of the hydrocarbons are removed. Such removal of polymerized fractions or higher molecular weight reaction products may be accomplished by subjecting the vapors to intimate contact with a down-flowing stream of reflux introduced to column 49 through line 50, such reflux consisting of any suitable liquid oil, such as condensate returned from the outlet 51. Instead, the polymerized or higher boiling fractions may be recovered by absorption in a relatively heavy and substantially non-vaporizable oil introduced through line 50. The stripped gas or vapors leave the column 49 through outlet 52, within which may be placed a valve 53 for maintaining any suitable back pressure on the system, for example from substantially atmospheric pressure to 100 lbs. per sq. in.

Where the system is to be employed for polymerization of liquid oils, the oil may be fed to the apparatus from any suitable source connecting, for example, with line 56. The oil may be subjected to polymerization while cold or at atmospheric temperature, or it may be preheated to any particular temperature at which, depending upon the oil, most effective polymerization will occur. To illustrate, in treating polymerizable liquid petroleum fractions, the oil may be preheated to temperatures as high as 400° F. or above. Upon leaving the polymerizing unit, the oil may be discharged through line 57 to storage or further treatment as may be desired, or through line 58 to column 49 for distillation or fractionation.

The polymerizing action of the unit 13 upon unsaturated hydrocarbon vapors, as well as a typical liquid fraction, is shown by the following data obtained from test runs.

Normally uncondensable cracking plant tail gases under pressure of 30 lb. per. sq. in. gage were passed through a substantially ⅜ in. (i. d.) feed line to the polymerizing unit 13 containing 7 in. diameter carborundum discs. The rotating disc was driven at a speed of around 3000 R. P. M. and 100 cc. of polymerized condensate containing low boiling hydrocarbon fractions was collected from the coil of an ice-packed cooler 47 during approximately fifteen minutes of operation. Immediately thereafter, the gas from the feed line was by-passed around the unit 13 directly to the cooler. During the following fifteen minutes, only a slight amount of condensate was obtained from the cooler, thus indicating that the production of condensate during the first period was due to conversion in the unit 13 of constituents of the gas into polymerized and condensable fractions.

As illustrative of the degree of polymerization of a typical liquid hydrocarbon that can be effected by the invention, the results of an experimental run using the apparatus substantially as described are given below. An unheated, substantially pure liquid olefin, heptene ($C_7H_{14}$), was passed between the discs at a rate of about one pint each twenty minutes, the moving disc being rotated at 3000 R. P. M. This particular hydrocarbon was obtained in the cracking of petroleum oil and had been fractionally distilled to give the pure heptene, although it doubtless contained some isomeric heptenes. It was chosen because its boiling temperature makes it easy to handle at normal temperatures, and any changes in its composition are easily detected by gravity and distillation measurements.

The characteristic tests for polymerization of an oil are the drop in the A. P. I. gravity (rise in specific gravity) and the rise in the boiling point range, which may be observed by the rise in the boiling points of the last fractions of the oil in the Engler distillation. The following table shows the comparative boiling temperatures of corresponding fractions of the original and polymerized heptene stocks:

Table

| Stock | Gravity A. P. I. | Temperature (° F.) in Engler distillation | | | | | | | | | | | | |
|---|---|---|---|---|---|---|---|---|---|---|---|---|---|---|
| | | I. B. P. | 5% | 10% | 20% | 30% | 40% | 50% | 60% | 70% | 80% | 90% | 95% | E. B. P. |
| Original | 67.0 | 187 | 191 | 192 | 193 | 193 | 193 | 194 | 195 | 196 | 197 | 199 | 204 | 236 |
| After polymerization action | 61.6 | 187 | 194 | 196 | 200 | 203 | 206 | 209 | 214 | 223 | 244 | 334 | 385 | 392 |

The initial boiling points in the data of the table are that of pure unchanged heptene remaining unpolymerized, but the effect of polymers on the boiling range begins to be manifest even in the 5% fractions. For example, when 70% was over, the boiling point of the treated material was 223° F. in comparison with 196° F. of the untreated, indicating a rise of 27° F. Likewise, the 80% point shows a 47° rise; the 90% point, a 135° rise; the 95% point, a 181° rise; and the final amount that distilled over, a 156° rise. The gravity of the treated material was 61.6° A. P. I., whereas that of the original material was 67.0° A. P. I. The marked drop in the A. P. I. gravity and rise in the boiling point range of the heptene show conclusively that polymerization is effected.

I claim:

The method of polymerizing hydrocarbons, that includes constantly urging together a pair of surfaces with one surface moving relative to the other at high velocity, at least one of said surfaces being finely roughened and containing silicon carbide as a polymerizing catalyst, passing a stream of hydrocarbons between said surfaces and thereby causing the hydrocarbons to become polymerized by the action of said catalyst and the relative movement of said surfaces, and withdrawing the polymerized hydrocarbons in a fluid stream from between said surfaces.

WILLIAM T. HANCOCK.